No. 870,346. PATENTED NOV. 5, 1907.
W. W. CROSBY.
GREASE CUP.
APPLICATION FILED JAN. 19, 1907.
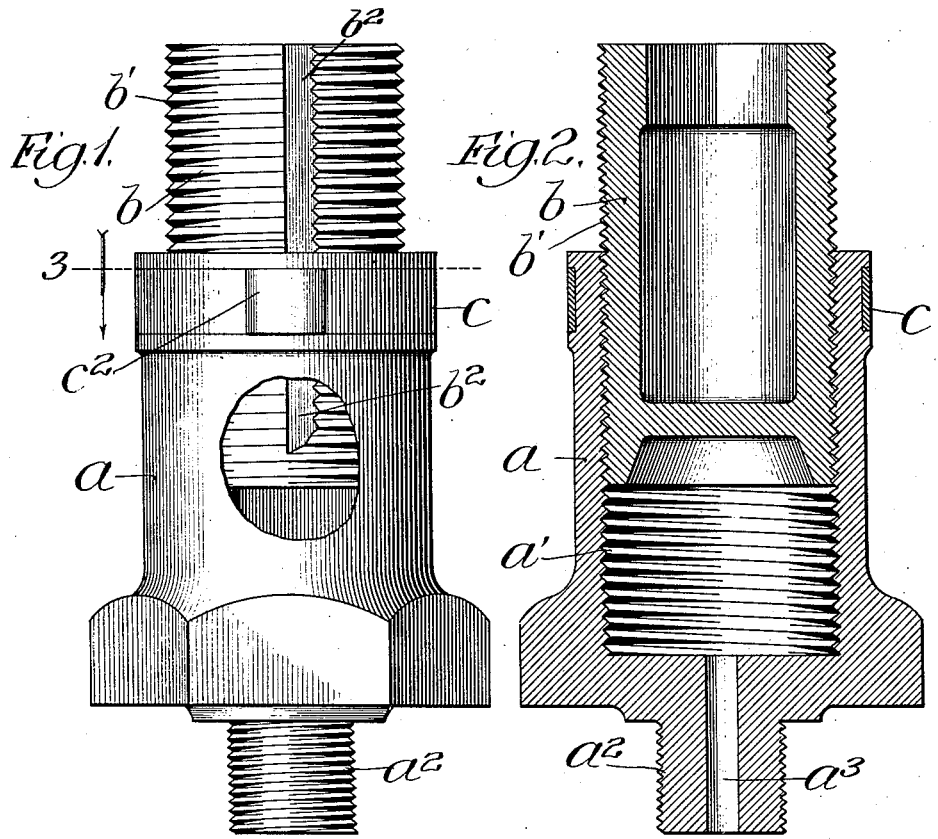
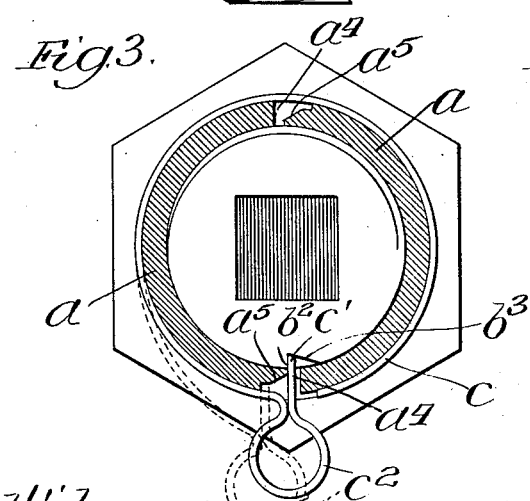
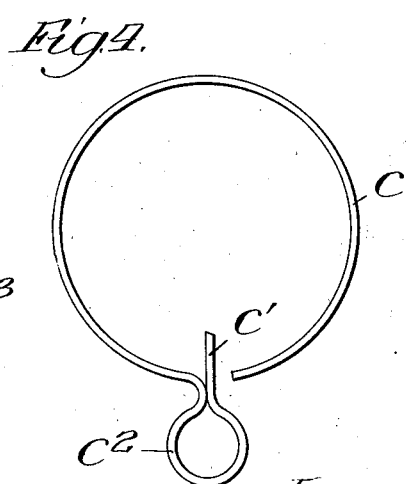
Witnesses:
Chas. E. Gaylord.
John Enders.
Inventor:
William Walker Crosby,
By Thomas F. Sheridan,
Atty.

UNITED STATES PATENT OFFICE.

WILLIAM WALKER CROSBY, OF TACOMA, WASHINGTON.

GREASE-CUP.

No. 870,346.  
Specification of Letters Patent.  
Patented Nov. 5, 1907.

Application filed January 19, 1907. Serial No. 353,098.

*To all whom it may concern:*

Be it known that I, WILLIAM WALKER CROSBY, a citizen of the United States, residing at Tacoma, in the county of Pierce and State of Washington, have invented certain new and useful Improvements in Grease-Cups, of which the following is a specification.

My invention relates to grease cups to be used especially for the supplying of lubricating medium to side rods or main rods of locomotives, or to any reciprocating part of machinery where grease is used as a lubricant.

The object of my invention is to construct a simple and economical grease cup, by means of which the grease may be supplied to the parts as is required and to prevent the accidental operation of the parts when the supply of lubricant is not required.

To this end my invention consists in the details and combinations hereinafter set forth and claimed.

In the accompanying drawings—Figure 1 is a side elevation of my improved grease cup showing the parts in operative position. Fig. 2 is a longitudinal sectional elevation of the parts shown in Fig. 1. Fig. 3 is a transverse section on the line 3 of Fig. 1. Fig. 4 is a top plan view of the locking spring.

In carrying out my invention I provide a grease cup comprising a cup-shaped receptacle $a$ for containing grease, this receptacle being interiorly screw threaded, as shown at $a'$. The receptacle is also provided with a screw threaded stem, by means of which it may be attached to the parts to be lubricated, this stem being provided with a longitudinal passageway $a^3$ through which the grease is fed.

A plunger $b$ having exterior screw threads $b'$ corresponding to the screw threads of the cup is provided. This plunger is mounted in the grease cup. It will be understood that the cup being filled with grease, the plunger is placed in position. As the plunger is forced downwardly by turning it, the grease is forced through the passageway $a^3$ and thus fed to the parts to be lubricated.

It is desirable to provide some means whereby the rotation of the plunger may be prevented, except when it is desired to feed the lubricant. I provide, therefore, the receptacle with an annular recess at the upper end thereof, and in this recess I mount a spring $c$, shown as a clasp spring encircling the receptacle. This spring is provided with an inturned end portion $c'$ and is formed at a point adjacent the inturned end portion with a handle portion $c^2$. The receptacle is also provided with a passageway or with a series of passageways $a^4$, these passageways extending through the wall of the cup and communicating with the annular recess. The plunger is provided with a longitudinal recess $b^2$ extending from the top of the plunger to a point substantially adjacent the bottom thereof. It will now be understood that when the inturned end of the spring is in position in the passageway so as to pass through the opening or passageway in the wall of the receptacle it will engage with the recess in the plunger and thus lock the plunger against accidental rotation, thus preventing the feeding of the lubricant, except when this feeding is desired.

It will be observed that the recess in the plunger has one radial wall $b^2$ and an inclined wall $b^3$. The radial wall prevents the turning of the plunger to withdraw the plunger from the receptacle until the end of the spring has been withdrawn by means of the handle. The plunger, however, may be turned to feed the lubricant without withdrawing the handle, the end of the spring in this case riding up the inclined wall, as will be readily understood. The walls of the passageway in the cup or receptacle are similarly formed, so that the spring may readily be guided into operative position by means of the inclined portion or wall $a^5$.

It will be understood, of course, that there may be as many of the passageways $a^4$ as are desirable, though I have shown but two in the accompanying drawings.

The operation of my device will be readily understood without further description.

I claim:

1. A grease cup comprising a grease receptacle provided at one end with an annular recess, a plunger mounted in the grease cup, and means mounted in the recess to lock the plunger against movement.

2. A grease cup comprising an outer grease receptacle, a plunger mounted therein, said receptacle being provided with an annular recess at one end and with a passageway opening into the recess, a longitudinally movable plunger mounted in the receptacle, said plunger having a longitudinal recess in its side, and means mounted in the annular recess and engaging the passageway and plunger recess to lock the plunger against movement.

3. A grease cup comprising a grease receptacle having an annular recess at one end and a passageway communicating with the recess, a plunger mounted in the receptacle having a longitudinal recess, and a spring member mounted in the annular recess and encircling the receptacle, said spring member being provided at one end with an inwardly turned portion entering the passageway and longitudinal recess.

4. A grease cup comprising an outer grease receptacle, a plunger mounted therein, a clasp spring encircling the outer receptacle, and provided with means engaging the plunger to prevent movement thereof.

WILLIAM WALKER CROSBY.

Witnesses:
RUB. CROSBY,
JOHN METZGER.